C. O. Bush
Water Elevator

N° 37,492. Patented Jan. 27, 1863.

End Elevation

Side Elevation

Plan

Details of Bucket B.
going up full

Section

Elevation

Attest
W. W. Latham
Richard Alderson

Inventor
Clark O. Bush

C. O. Bush,
Water Elevator,
Nº 37,492. Patented Jan. 27, 1863.
Sheet 2-3 Sheets.
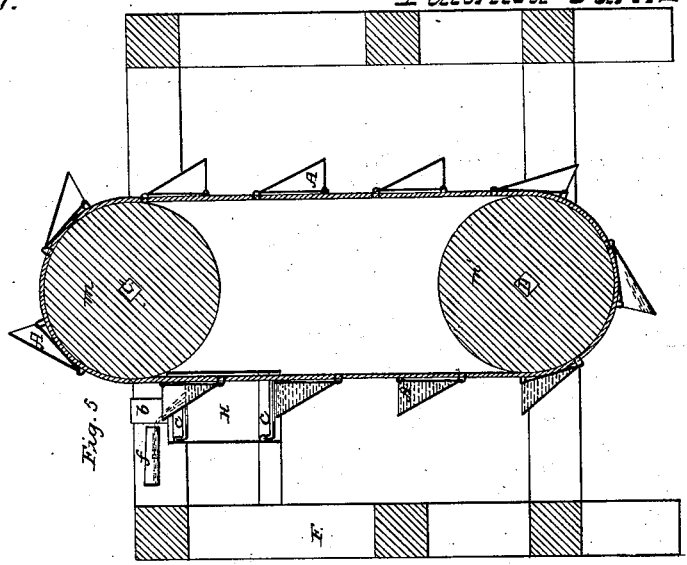
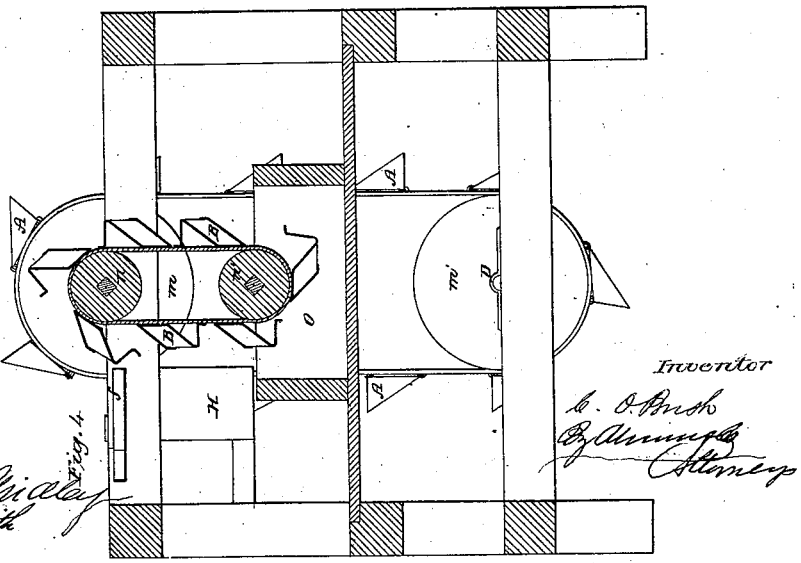
Attest:
Inventor Sheet 3-3 Sheet
C. O. Bush.
Water Elevator,
N° 37,492.  Patented Jan. 27, 1863.
Details of Bucket A.
going down Full
and of Splash Boards C. to conduct all
the water into the Buckets
Plan
Fig. 8.
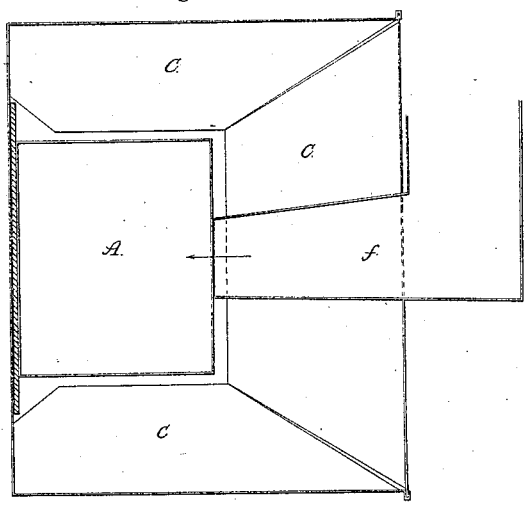
Fig. 9. Section
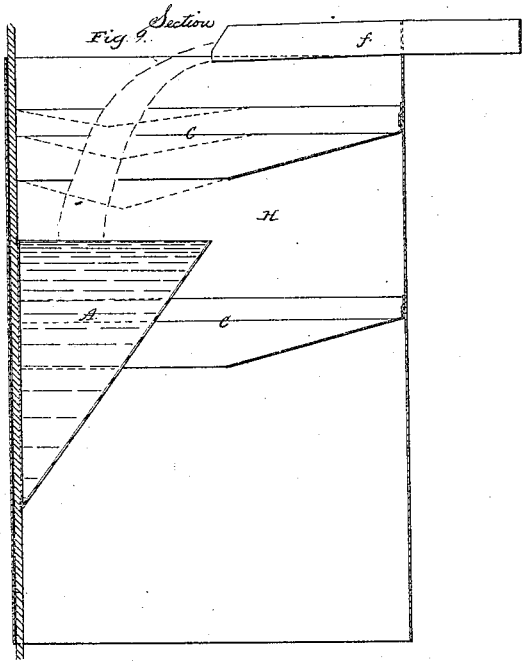
Attest:
W. W. Latham
Richard Alderson
Inventor:
Clark O. Bush

UNITED STATES PATENT OFFICE.

CLARK O. BUSH, OF MICHIGAN BLUFF, CALIFORNIA.

IMPROVEMENT IN WATER-ELEVATORS.

Specification forming part of Letters Patent No. 37,492, dated January 27, 1863.

*To all whom it may concern:*

Be it known that I, CLARK O. BUSH, of Michigan Bluff, in the county of Placer and State of California, have invented a new and useful Improvement in Water-Elevators; and I do hereby declare that the following is a full, clear, and exact description of the same, reference being had to the accompanying drawings, making a part of this specification, in which—

Figure 1:
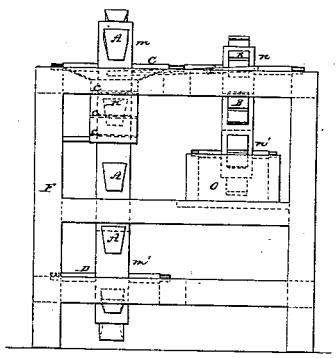
Figure 2:
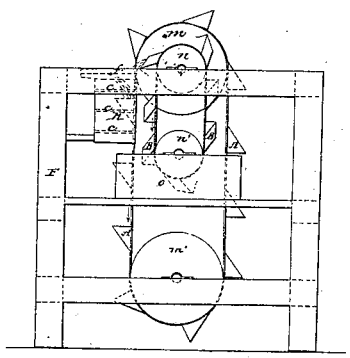
Figure 3:
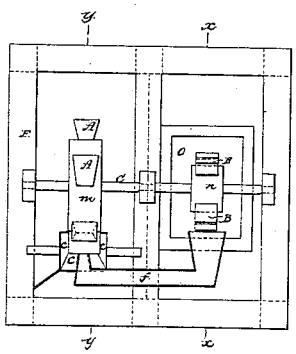
Figure 6:
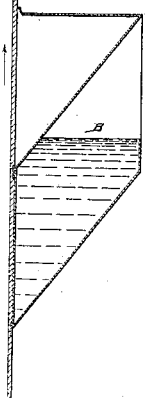
Figure 7:
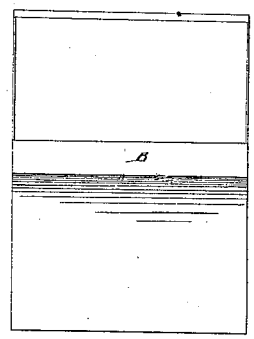

Figure 1 is an end elevation of a machine embodying my improvement. Fig. 2 is a side elevation of the same. Fig. 3 is a plan or top view of the same. Fig. 4 is a section taken in the line $x$ $x$ of Fig. 3. Fig. 5 is a section taken in the line $y$ $y$ of same figure. Figs. 6, 7, 8, and 9 represent portions of the machine in detail.

Similar letters of reference indicate corresponding parts in the several figures.

The subject of this invention is a machine for elevating or raising water for the purpose of draining land, mines, &c.

It consists in an arrangement of two endless chains of buckets, which chains are of unequal length, and connected together by a line-shaft, in combination with a conductor or conduit, whereby the water elevated by the short chain of buckets is conducted into the buckets of the long chain, and by its gravity made to operate the machine, and thereby to elevate water from the mine or pit so long as any water is within reach of the buckets of the lifting or short chain, all as will be hereinafter fully explained.

To enable others skilled in the art to fully understand my invention, I will proceed to describe its construction and operation.

In the accompanying drawings, $m$ and $n$ represent two wheels or drums, keyed or otherwise suitably attached to a shaft, C, near its opposite ends, and having suspended from them two endless bands, to which are attached a series of buckets, A and B, respectively, forming two endless chains of buckets, the chain of buckets A being double the length (more or less) of the chain of buckets B.

$n'$ $n'$ are drums attached to short shafts D E, respectively, and serving to keep the endless bands stretched or taut.

The shaft C, which may be either a single length or a number of lengths coupled together, is adapted to revolve in suitable boxes on top of the frame F.

O represents the pit or cistern which contains the water to be elevated, or which it is desired to drain.

$f$ is an inclined trough or conduit receiving at one end the water discharged from the buckets B, and at the other end discharging it into the buckets A, where by the greater number of buckets and greater length of band it acts by its weight as a motor to drive or operate the machine, and thus to elevate a less quantity of water in the buckets B. The buckets A in their descent, and while being filled, pass through a curb, H, which is furnished on three sides with two sets of splash-boards, $c$ $c$, and suspended from the frame F by arms $b$, (seen in Fig. 5,) or in any other suitable manner. The splash-boards $c$ $c$ serve to render the machine more efficient in its operations by preventing the escape of water otherwise than by the buckets, any water falling on the splash-boards being by them directed, or a larger portion thereof, into the descending buckets.

The operation is as follows: When the machine is once put in motion, which may be done by filling the buckets A on one side of the drums by hand, or by rotating the chain of buckets until a sufficient quantity of water has been raised by the buckets B to fill the buckets A before mentioned, the weight of the water in the latter will cause them to descend, and thereby put in operation the whole machine, which will continue to operate so long as sufficient water remains in the cistern to supply the buckets of the elevator as they are presented or pass under the lower drum.

I am aware that an endless chain of buckets is a very old device for raising water, and also that all the parts herein described and represented, separately or in themselves considered, are old; therefore I do not wish to be understood as claiming such, nor as claiming the duplication thereof, except as such duplication is substantially a new arrangement for the production of a new and useful result, as shown in the functions performed; but, Having fully described my invention, what

I claim as new, and desire to secure by Letters Patent, is—

1. The endless chain of buckets B and inclined trough or conduit $f$, in combination with the endless chain of buckets A, when the latter is operated by the water lifted by the former, as specified.

2. The curb H, splash-boards $c\ c$, and inclined trough or conduit $f$, in combination with the endless chain of buckets A, when arranged to operate in the manner and for the purpose specified.

CLARK O. BUSH.

Witnesses:
. EDWIN TYLER,
C. KELLOGG.